Aug. 10, 1948.  S. D. POOL ET AL  2,446,883
TRACTOR-MOUNTED THRESHER
Filed May 11, 1946  3 Sheets—Sheet 1
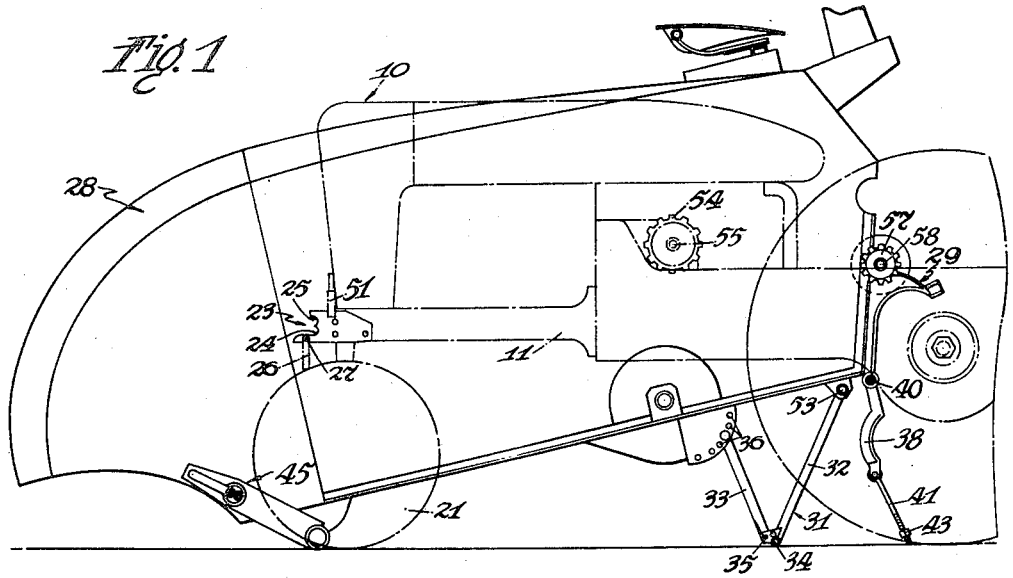
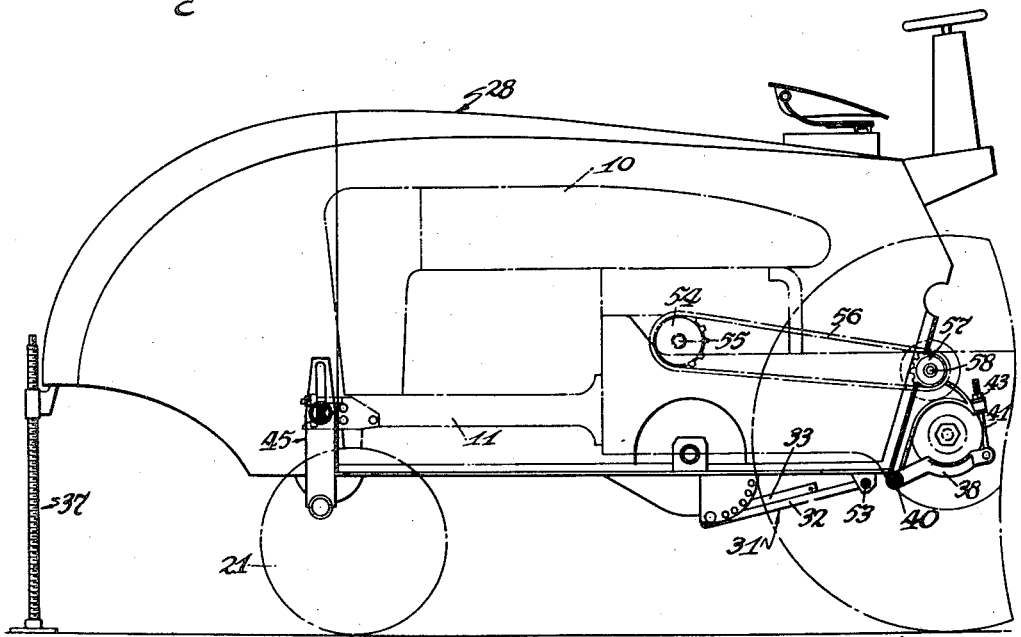
Inventors
Stuart D. Pool
Rexford D. Downing
By Paul O. Pippel
Atty.

Aug. 10, 1948.    S. D. POOL ET AL    2,446,883
TRACTOR-MOUNTED THRESHER
Filed May 11, 1946    3 Sheets-Sheet 2

Inventors
Stuart D. Pool
Rexford D. Downing
By Paul O. Pippel
Atty

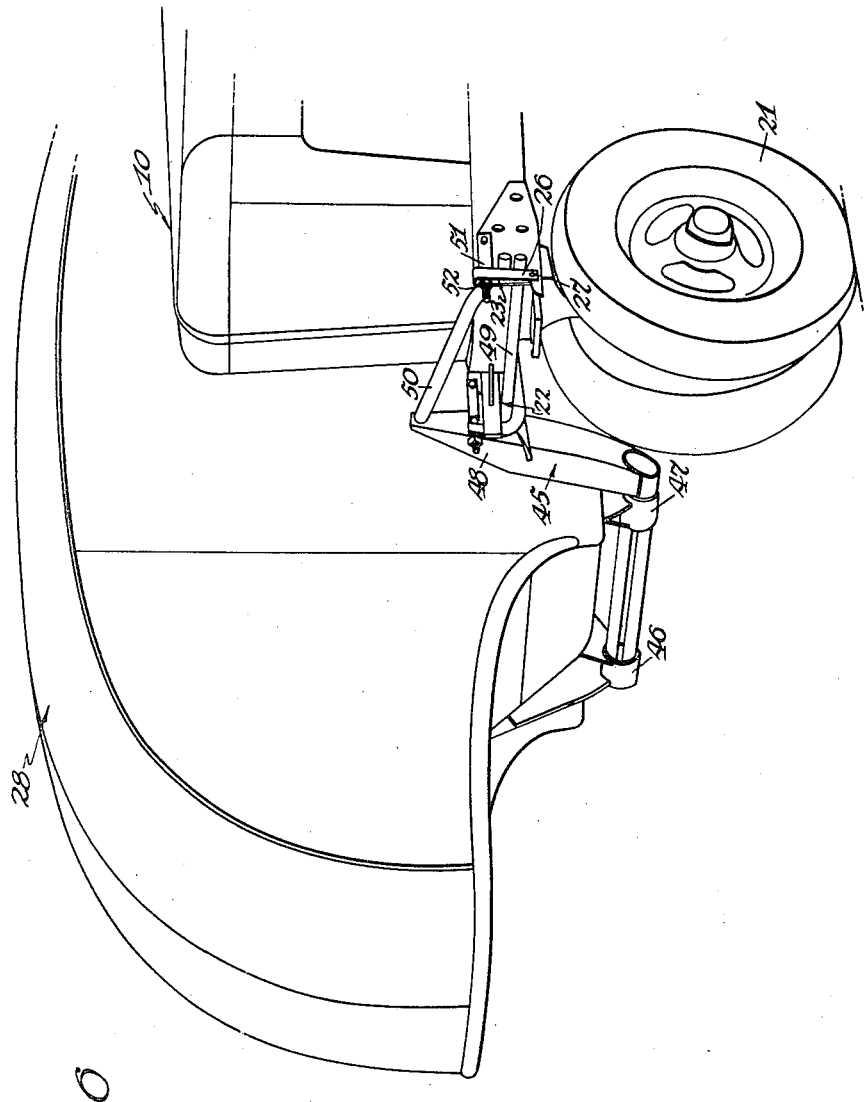

Patented Aug. 10, 1948

2,446,883

UNITED STATES PATENT OFFICE 2,446,883

TRACTOR-MOUNTED THRESHER

Stuart D. Pool, Moline, and Rexford D. Downing, Rock Island, Ill., assignors to International Harvester Company, a corporation of New Jersey Application May 11, 1946, Serial No. 669,022

5 Claims. (Cl. 130—27)

This invention relates to a new and improved tractor-mounted thresher and has for one of its principal objects the provision of means for simply and easily effecting a mounting of a threshing apparatus on a farm tractor.

An important object of this invention is to provide a tractor of the tricycle type having a narrow longitudinally extending body, a wide transverse axle at one end thereof supporting large traction wheels, a threshing device of the relatively long narrow type, and means for quickly attaching the long narrow threshing device onto the tractor axle adjacent the long narrow tractor body with a minimum of manpower.

Another important object of the invention is the provision of means for mounting a threshing machine separator onto a tractor by tilting.

A further object of the invention is to utilize a retractible stand beneath one end of the threshing machine and raising the other end of the threshing machine to effect a tilting of the entire machine about the retractible stand as a fulcrum for accomplishing mounting of the threshing machine on a tractor.

A still further important object is the provision of forwardly extending hooks on a threshing apparatus and means for tilting the threshing apparatus so that the hooks on the threshing machine come down over one of the tractor axles to thereupon support that end of the threshing machine on the tractor.

Another and still further important object of this invention is the provision of a tractor having an extended axle thereon and spaced housings superposing axles for receiving attaching hooks on a threshing mechanism.

Still another object is to provide a three-point suspension for a long narrow threshing machine on a tricycle tractor.

Other and further important objects of this invention will become apparent from the disclosures in the following specification and accompanying drawings, in which:

Figure 1 is a side elevational view of a tricycle tractor and a threshing apparatus preliminary to being mounted on the tractor;

Figure 2 is a view of the device similar to that shown in Figure 1 in which the threshing apparatus has been raised and locked in mounted position on the tractor;

Figure 3 is a front elevational view of the device as shown in Figure 2;

Figure 4 is a sectional view taken on the line 4—4 of Figure 3;

Figure 5 is a sectional view taken on the line 5—5 of Figure 4; and

Figure 6 is a perspective view of the rear end of the tractor-mounted threshing machine.

As shown in the drawings:

The reference numeral 10 indicates generally a tractor suitable for farm use and of the tricycle type. The tractor has a narrow longitudinally extending body 11 and, as best shown in Figure 3, has a transverse axle 12 carrying large traction wheels 13 and 14 at the outer ends thereof. A hexagonal housing 15 surrounds the drive axle 12 and is adapted to carry implements when the implements are mounted on the tractor. In order that the threshing machine or other implements may fit between the longitudinally extending body portion 11 and the large traction wheel 14, an axle extension 16 is placed in axial alinement with the axle 12 and is joined by a coupling member 17.

As best shown in Figure 3, an outer housing 18 is clamped over the hexagonal axle housing 15 and spaced laterally therefrom is another housing 19 clamped over the axle coupling 17. As shown in Figure 5, a cross-section of both of these housings 18 and 19 has an inverted V-shape adapted to receive and center an inverted V-shaped clamping member 20.

The rearward end of the tractor is equipped with relatively small steerable tricycle wheels 21. At the rear end of the body 11 of the narrow tractor are spaced rearwardly open sockets 22 and 23. These rearwardly open sockets 22 and 23 are provided with vertically spaced semi-circular portions 24 and 25 within which transverse rod members on attaching implements may be inserted and locked therein by means of a latch member 26 pivoted at 27 and swingable upwardly to close the openings 24 and 25.

As shown in Figure 1, a threshing machine 28 comprising a separator having a narrow longitudinally extending body structure is adapted to be positioned closely adjacent the tractor body and within the outer traction wheel 14. The forward end of the thresher 28 is equipped with forwardly extending overhanging hooks laterally spaced as shown at 29 and 30. As shown in Figure 5, these hook members 29 and 30 have an inverted V-shape portion in cross section as shown at 20 to engage the inverted V-shape housings 18 and 19 on the stationary axle housing 15 and journaled on the live axle housing or coupling 17 respectively.

As shown in Figure 1, a stand 31 is provided beneath the threshing structure 28 and inwardly of the end of the thresher which carries the hook members 29 and 30. The stand 31 includes a pair of brace members 32 and 33 connected at spaced points on the underside of the thresher and converging to carry a ground-engaging foot or the like 34 in the form of a transverse bar. The brace member 33 is pivoted at its lower end at 35 and is adjustably attached to any one of a series of vertically spaced holes 36. Attachment of the brace member 33 in the different holes 36 permits varying of the height of the stand 31. The stand 31 acts as a fulcrum about which the thresher may be pivoted.

In the position of the thresher as shown in Figure 1, the hook members 29 and 30 are spaced above and slightly rearwardly of the axle 12—16 with its housings 18 and 19. A jack 37 is applied to the rear or end of the thresher opposite the end carrying the hooks 29 and 30. As shown in Figure 2, the thresher 28 has been raised by the jack about the stand 31 causing the hooks 29 and 30 to come down onto the axle housings 18 and 19. The inverted V-shapes of the hook members 29 and 30 and the housings 18 and 19 compensate for any lateral discrepancies in the positioning of the thresher and cause the thresher to be properly centered in its mounted position. When the jack has reached its uppermost position, as shown in Figure 2, holding clamp members 38 and 39 pivoted at 40 on the underside of the thresher 28 are swung upwardly beneath the superposed axle housings 18 and 19, and by means of swinging bolt members 41 and 42, the hook members are joined with the under clamp members and are drawn up tightly by the nut members 43 and 44.

After the thresher is attached to the spaced points on the tractor axle 12—16, the rearward end of the thresher is attached to the tractor by means of a crank-arm 45 pivoted on spaced journals 46 and 47 beneath the rearward end of the thresher separator. This crank-arm 45, as shown in Figure 6, has an upwardly extending arm 48 and transversely extending tubular members 49 and 50 which are adapted to fit within the open sockets 24 and 25 when the hinged latch member 26 is swung upwardly and held by a swinging eyebolt 51 and a cooperating nut 52. Although the cross tubular member 50 is spaced upwardly from one side of the tractor body, it curves downwardly to engage the open sockets 25 at the opposite side of the tractor side.

At this point, in the mounting of the thresher, the jack 37 is removed and the stand 31 collapsed and retracted to a position as shown in Figure 2, in which the hinged brace member 33 is removed from its locking engagement with one of the holes 36 and dropped down on top of the brace member 32 and the entire stand raised as a unit about the hinge point 53, as shown in Figure 2. The lower end of the stand is then held in upward retracted position by hook means (not shown) beneath the thresher.

As shown in Figures 1 and 2 of the drawings, a sprocket 54 is mounted on a power take-off shaft 55 of the tractor and by means of a chain 56 drives a sprocket 57 mounted on a shaft 58. As best shown in Figure 3, the shaft 58 is carried across the thresher housing by upward extensions 59 and 60 on the hook members 29 and 30. In this manner drive from the tractor is transmitted across the thresher 28 to the outside thereof as shown by a V-belt pulley or the like 61.

Numerous details of construction may be varied throughout a wide range without departing from the spirit disclosed herein, and we therefore do not propose limiting the patent granted hereon otherwise than as necessitated by the appended claims.

What is claimed is:

1. A mounting for implements on tractors in which the tractors have a narrow longitudinally extending body, a transverse driving axle at one end of the tractor, large traction wheels on said axle spaced laterally from said narrow body and small wheels supporting the other end of the tractor, a stationary housing for said axle, and in which the implements include a relatively long narrow structure adapted to be positioned adjacent said long tractor body, comprising in combination means for mounting said implement on said tractor and including an overhanging hook member on one end of the implement, a stand positioned beneath and inwardly of the end of the implement having the hook member, means at the other end of the implement for raising the implement about the stand as a fulcrum and lowering the hook member over the axle housing, means for clamping said hook member to said axle housing, and means for connecting the jacked end of the implement to the tractor.

2. A mounting for implements on tractors in which the tractors have a narrow longitudinally extending body, a transverse driving axle at one end of the tractor, large traction wheels on said axle spaced laterally from said narrow body and small wheels supporting the other end of the tractor, and a stationary housing for said axle, and in which the implements include a relatively long narrow structure adapted to be positioned adjacent said long tractor body, comprising in combination means for mounting said implement on said tractor and including an overhanging hook member on one end of the implement, a retractible stand positioned beneath and inwardly of the end of the implement having the hook member, jack means at the other end of the implement for raising the implement about the stand as a fulcrum and lowering the hook member over the axle housing, means for clamping said hook member to said axle housing, and means for connecting the jacked end of the implement to the tractor.

3. A mounting for threshers on tractors in which the tractors have a narrow longitudinally extending body, a transverse driving axle at one end of the tractor, large traction wheels on said axle spaced laterally from said narrow body and small wheels supporting the other end of the tractor, a first housing for said axle formed integrally with said tractor body, a second housing for said axle spaced from said first housing and journaled on the driving axle, and in which the threshers include a long narrow structure, and comprising in combination means for mounting said thresher on said tractor including laterally spaced overhanging hook members extending forwardly of one end of the thresher, a stand positioned beneath and inwardly of the thresher end carrying the hook members, means at the other end of the thresher for pivoting the thresher about the stand as a fulcrum and lowering the spaced hook members down over the spaced axle housings, clamp members hinged beneath the spaced housings and swingable upwardly about the hook members to maintain the one end of the thresher in fixed position on the tractor, and means for attaching the other raised end of the thresher to the tractor.

4. A mounting for threshers on tractors in which the tractors have a narrow longitudinally extending body, a transverse driving axle at one end of the tractor, large traction wheels on said axle spaced laterally from said narrow body and small wheels supporting the other end of the tractor, a first housing for said axle formed integrally with said tractor body, a second housing for said axle spaced from said first housing and journaled on the driving axle, and in which the threshers include a long narrow structure, and comprising in combination means for mounting said thresher on said tractor including laterally spaced overhanging hook members extending forwardly of one end of the thresher, a retractible stand positioned beneath and inwardly of the thresher end carrying the hook members, jack means at the other end of the thresher for pivoting the thresher about the stand as a fulcrum and lowering the spaced hook members down over the spaced axle housings, clamp members hinged beneath the spaced housings and swingable upwardly about the hook members to maintain the one end of the thresher in fixed position on the tractor, and means for attaching the other raised end of the thresher to the tractor.

5. A mounting for threshers on tractors in which the tractors have a narrow longitudinally extending body, a transverse driving axle at one end of the tractor, large traction wheels on said axle spaced laterally from said narrow body and small wheels supporting the other end of the tractor, a first housing for said axle formed integrally with said tractor body and said first axle housing having an inverted V-shape in cross section, a second housing for said axle spaced laterally from said first housing and journaled on the driving axle, and said second axle housing having a V-shape in cross section and in which the threshers include a long narrow structure, and comprising in combination means for mounting said thresher on said tractor including laterally spaced overhanging hook members associated with the forward end of said thresher and having a V-shape cross-section extending forwardly of one end of the thresher and corresponding in shape to the inverted V-shape axle housings, a retractible stand positioned beneath and inwardly of the thresher end carrying the hook members, jack means at the other end of the thresher for pivoting the thresher about the stand as a fulcrum and lowering the spaced hook members down over the spaced axle housings, clamp members hinged beneath the spaced housings and swingable upwardly about the hook members to maintain the one end of the thresher in fixed position on the tractor, and means for attaching the other raised end of the thresher to the tractor.

STUART D. POOL.
REXFORD D. DOWNING.

REFERENCES CITED

The following references are of record in the file of this patent:

UNITED STATES PATENTS

| Number | Name | Date |
|---|---|---|
| 1,840,481 | Wickerstam | Jan. 12, 1932 |
| 2,184,084 | Rosenthal et al. | Dec. 19, 1939 |
| 2,259,892 | Hyman | Oct. 21, 1941 |
| 2,259,893 | Hyman | Oct. 21, 1941 |
| 2,376,539 | Hitchcock et al. | May 22, 1945 |
| 2,376,541 | Johnson et al. | May 22, 1945 |
| 2,401,183 | Pool et al. | May 28, 1946 |

FOREIGN PATENTS

| Number | Country | Date |
|---|---|---|
| 753,594 | France | Aug. 12, 1933 |